United States Patent [19]
Kyrk

[11] 3,744,140
[45] July 10, 1973

[54] CIRCUMFERENCE MEASURING DEVICE
[75] Inventor: Harry J. Kyrk, Waukegan, Ill.
[73] Assignee: Abbott Laboratories, North Chicago, Ill.
[22] Filed: Jan. 11, 1971
[21] Appl. No.: 105,355

[52] U.S. Cl. .................................. 33/179, 33/139
[51] Int. Cl. .......................... G01b 3/02, G01b 3/10
[58] Field of Search ...................... 33/179, 139, 140, 33/177, 174, 2

[56] References Cited
UNITED STATES PATENTS
1,282,772  10/1918  Dinhofer .............................. 33/179
2,231,121  2/1941   Harmann ............................. 33/179
2,271,725  2/1942   Tunnicliff ............................ 33/179

FOREIGN PATENTS OR APPLICATIONS
2,000  1/1898  Great Britain ........................ 33/179

Primary Examiner—Louis R. Prince
Assistant Examiner—Steven L. Stephan
Attorney—Sherman and Shalloway

[57] ABSTRACT

A circumference measuring device including an elongated body forming a handle grip and a housing, a rotatable drum disposed in the housing, a flexible band having one end secured to the drum and a slot in the other end thereof to permit looping of the flexible band, and a rotatable measuring dial secured to a common shaft with the drum such that movement of the drum in tightening the flexible loop around an object to be measured moves the dial to permit the obtention of a circumferential measurement.

7 Claims, 7 Drawing Figures

PATENTED JUL 10 1973

INVENTOR,
HARRY J. KYRK
BY Sherman & Galloway
ATTORNEYS

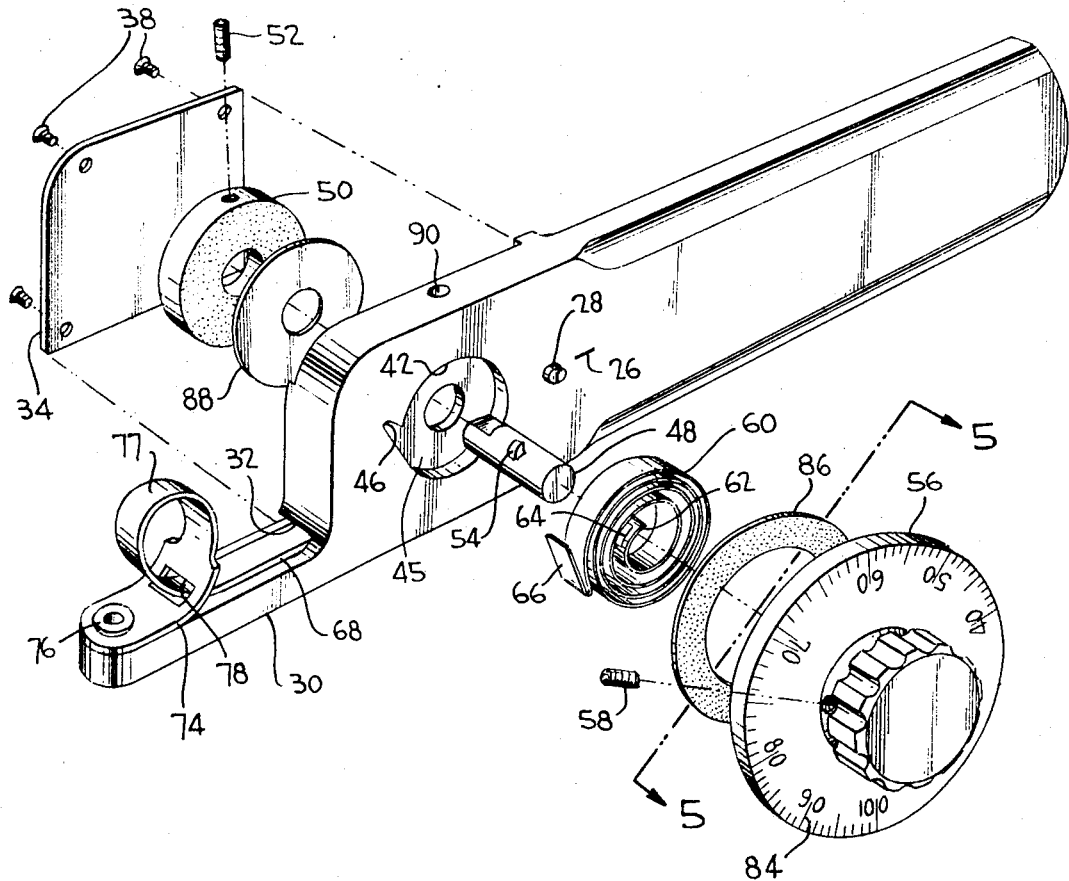
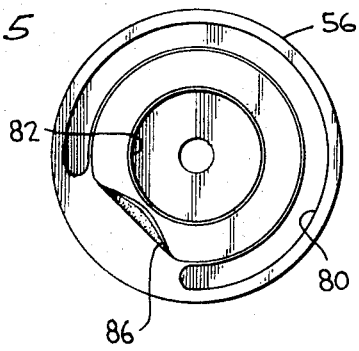

INVENTOR,
HARRY J. KYRK
BY Sherman & Shalloway
ATTORNEYS

CIRCUMFERENCE MEASURING DEVICE

BACKGROUND OF THE INVENTION

1. Field of the Invention

The present invention pertains to circumference measuring devices and more particularly to such devices for use in measuring diseased or inflamed joints.

2. Description of the Prior Art

The obtaining of circumferential measurements is a difficult task in that such measurements cannot readily be obtained by conventional measuring devices such as those utilized for linear or straight point-to-point measurements. Of particular difficulty is the measurement of inflamed joints such as those inflicted with arthritis, which measurements have previously been obtained with ring gages. One of the problems existing with the measurement of joints with ring gages is that a ring gage measures only a diameter and does not truly indicate the actual size of joints since joints are normally out-of-round.

It has been proposed to utilize flexible bands for circumferential measuring; however, devices utilizing such flexible bands have in the past not permitted simple measurement. That is, the means of reading the measurement accomplished by means of the flexible band has not been readily accessible to the user of the devices; and, accordingly, it has been difficult to obtain precise measurements therewith. One of the disadvantages of conventional circumference measuring devices utilizing flexible bands is that two hands are required to obtain measurements, and such devices are, therefore, awkward for use by physicians and those utilizing the devices on themselves such as to measure the knuckle of a finger. Another disadvantage of such circumference measuring devices is that they are not uniformly drawn or tensioned against the object to be measured. That is, the band must be tightened manually, and the human error thus involved with respect to the tension applied to the band renders such measurements highly variable dependent on tension.

SUMMARY OF THE INVENTION

Accordingly, it is an object of the present invention to provide a circumference measuring device that may be easily operated with one hand to provide precise measurements.

The present invention is generally characterized in a circumference measuring device including an elongated body forming a handle grip and a housing, a drum rotatably disposed in the housing, a dial rotatably movable with the drum, a flexible band having an intermediate portion looped upon itself to form a measuring loop, a movable end secured to the drum, and a stationary end secured to the body, the dial having a scale thereon cooperating with an indexing mark on the body whereby the circumference of an object is determined by the position of the scale relative to the indexing mark and the dial is movable with the thumb of a hand grasping the handle grip.

Another object of the present invention is to construct a circumference measuring device which applies uniform tension to a flexible band to permit the obtention of precise measurements.

A further object of the present invention is to construct a circumference measuring device with a dial positioned to be operable by the thumb of the hand utilized to hold the device.

Some of the advantages of the circumference measuring device of the present invention over the prior art are that the device may be inexpensively manufactured, the device provides uniform measurements, and the device may be easily operated with one hand.

Other objects and advantages of the present invention will become apparent from the following description of the preferred embodiments taken in conjunction with the accompanying drawings.

BRIEF DESCRIPTION OF THE DRAWINGS

FIG. 4 is an exploded view of the device of FIG. 1.

FIG. 5 is a view of the dial of FIG. 4 taken along lines 5—5.

DESCRIPTION OF THE PREFERRED EMBODIMENTS

Figure 1:
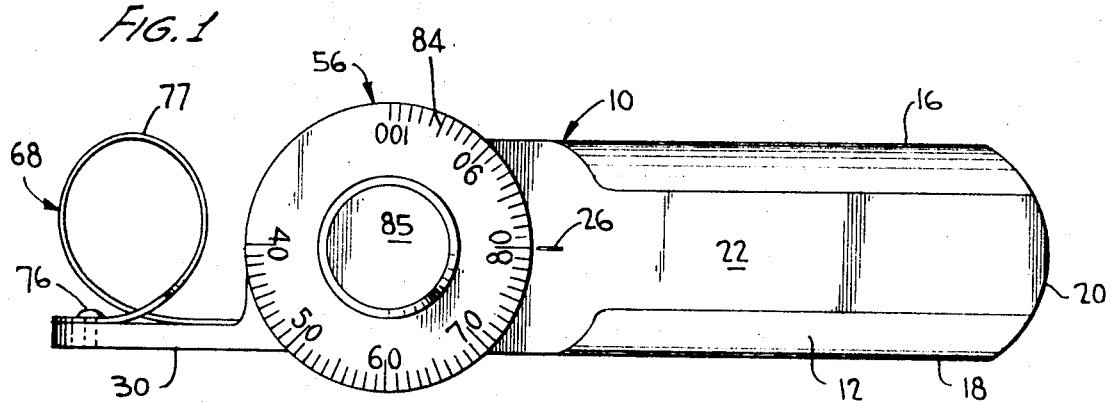
FIG. 1 is a front elevation of a circumference measuring device according to the present invention.
Figure 2:
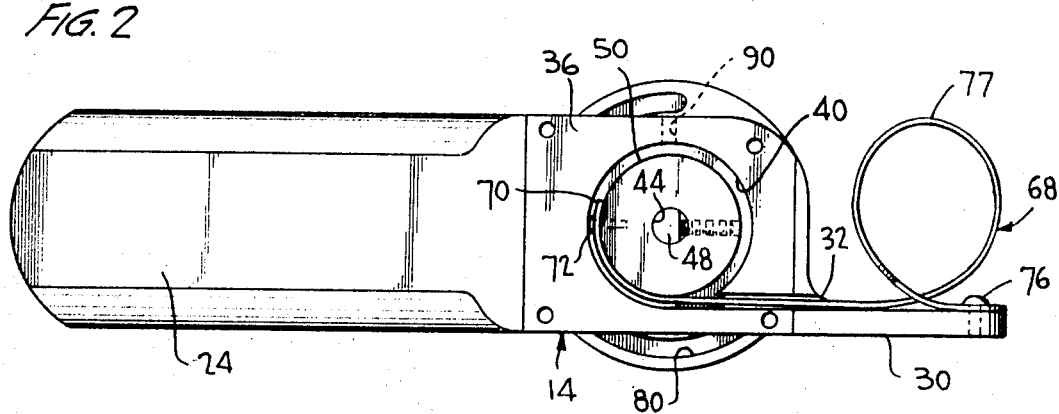
FIG. 2 is a rear elevation of the device of FIG. 1.
Figure 3:
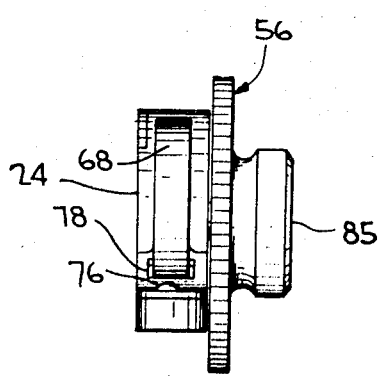
FIG. 3 is a side elevation of the device of FIG. 1.

A circumference measuring device in accordance with the present invention is illustrated in FIGS. 1 through 5 and includes an elongated body 10 forming a handle grip 12 and a housing 14. Body 10 has flat upper and lower edges 16 and 18 which extend in parallel relation from housing 14 to an arcuate end 20. The body has flat parallel sides 22 and 24 which arcuately terminate at upper and lower edges 16 and 18 in order to provide a rounded grip to facilitate grasping of the handle grip 12 with the hand.

As best illustrated in FIG. 4, an indexing mark 26 is centrally positioned on the surface of body 10 adjacent housing 14 and a cylindrical stop 28 protrudes from the surface of body 10 adjacent indexing mark 26. An arm 30 extends from housing 14, and a channel 32 is aligned with arm 30 and communicates with the housing, as will be explained in more detail hereinafter.

A cover 34 is fastened against a recessed side surface 36 of housing 14 by means of four screws 38, and a bore 40 is centrally disposed in side surface 36 thereof. A bore 42 is disposed in the opposite surface of housing 14 and communicates with bore 40 by means of a cylindrical aperture 44 extending through a wall 45. Bore 42 has a diameter less than that of the diameter of bore 40 and is formed with a recess 46 extending tangentially from the outer surface thereof.

A shaft 48 extends through aperture 44 and has one end secured in a central bore of a cylindrical drum 50 by means of a set screw 52. A tang 54 protrudes radially outwardly from a central portion of shaft 48 in alignment with bore 42, and the other end of shaft 48 is secured to a measuring dial 56 by means of a set screw 58. A flat spring 60 has an inner end 62 with a slot 64 therein which is adapted to receive tang 54, and spring 60 is wound counter clockwise around shaft 48 and disposed within bore 42 such that an outer end 66, which is bent upon itself, is held in place in recess 46.

A flexible band 68 has a movable end 70 attached to the outer surface of drum 50 by means of a rivet 72 and a stationery end 74 which is secured to the end of arm 30 by means of a rivet 76. An intermediate portion 77 of flexible band 68 is looped upon itself to form a measuring loop and extends through a rectangular slot 78 formed adjacent the stationery end 74 of the flexible band. The flexible band 68 must be made of material which is sufficiently strong such that it will not stretch under measuring tension; however, the material must also be sufficiently soft and pliable to conform to irregular surfaces of objects to be measured. Any polymeric materials having the above characteristics may be utilized to form flexible band 68 such as, for example, polyvinyl chlorides.

Dial 56, as best illustrated in FIG. 5, has a groove 80 extending around approximately 270° of the periphery thereof, and groove 80 is radially spaced from the center of dial 56 to receive stop 28. Accordingly, dial 56 can be rotated only 270° as controlled by abutment of stop 28 with the ends of groove 80. An annular chamber 82 having a diameter equal to that of bore 42 is formed in the center of dial 56 such that when the dial is assembled with body 10, spring 60 will be housed partially in both bore 42 and recess 82. A scale 84 is radially arranged on the outer peripheral surface of dial 56 around a knurled knob 85 and is adapted to be read in cooperation with indexing mark 26. For exemplary purposes, the scale 84 is graduated to permit circumferential measurements between 40 and 100 mm.

In order to facilitate rotating action of the device of the present invention, a ring of polytetrafluoroethylene 86 is secured such as by means of an adhesive to dial 56 between groove 80 and recess 82, and a ring 88 of polytetrafluoroethylene is adhesively secured to the inner surface of drum 50. A small diameter bore 90 communicates with the upper edge 16 of body 10 and bore 40 to permit insertion of an Allen wrench to engage screw 52 and permit disassembly of the device without permitting spring 60 to unwind.

When the device is assembled, drum 50 is rotatably housed in bore 40, and dial 56 is secured to the other end of shaft 48 to contact the outer surface of body 10 and to hold spring 60 in place within bore 42. The connection of end 62 of the spring with tang 54 on shaft 48 biases the shaft in a counter clockwise direction such that drum 50 is rotated to tighten the measuring loop of flexible band 68. The rotation of drum 50 is controlled by the abutment of stop 28 with the end of groove 80 in dial 56 since shaft 48, drum 50 and dial 56 are rotatable together. Thus, it will be appreciated that flexible band 68 is under relatively uniform tension within the range of measurements provided thereby and that in order to increase the size of the measuring loop, dial 56 must be rotated clockwise against the force of spring 60.

Figure 6:
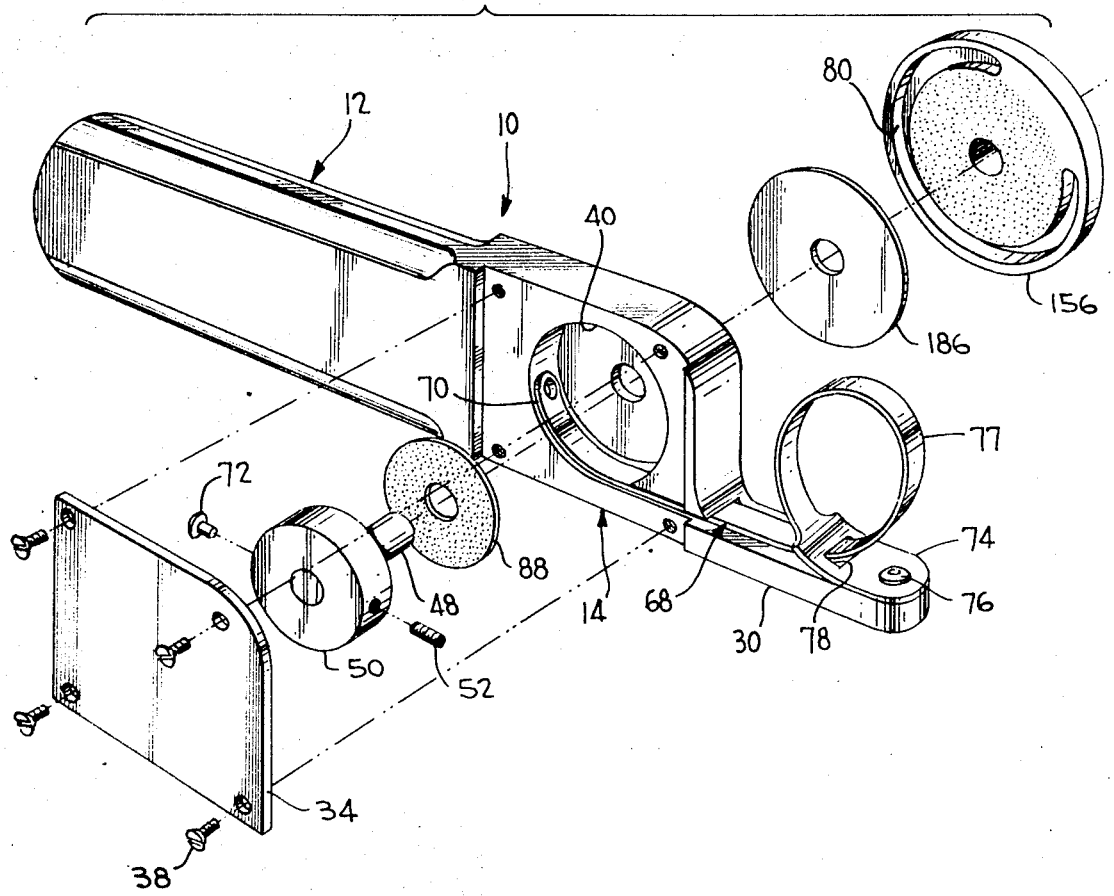
FIG. 6 is an exploded view of another embodiment of the present invention.

Another embodiment of the present invention is illustrated in FIG. 6 and parts in the embodiment of FIG. 6 identical to parts in the embodiments of FIGS. 1 through 5 are given identical reference numbers and are not described again. Parts in the embodiment of FIG. 6 which are similar to parts in the embodiment of FIGS. 1 through 5 will be given the same reference numbers with 100 added.

The primary difference between the embodiments of FIGS. 1 through 5 and the embodiment of FIG. 6 is that the circumference measuring device of FIG. 6 does not utilize a spring to provide tension on the measuring loop 77. Accordingly, dial 156 does not have a recess therein, but, rather, only has a small bore to receive an end of shaft 48. Since there is no recess in dial 156, the polytetrafluoroethylene ring 186 may be increased in surface area and the side of housing 14 opposite bore 40 will have a flat surface to contact ring 186.

Figure 7:
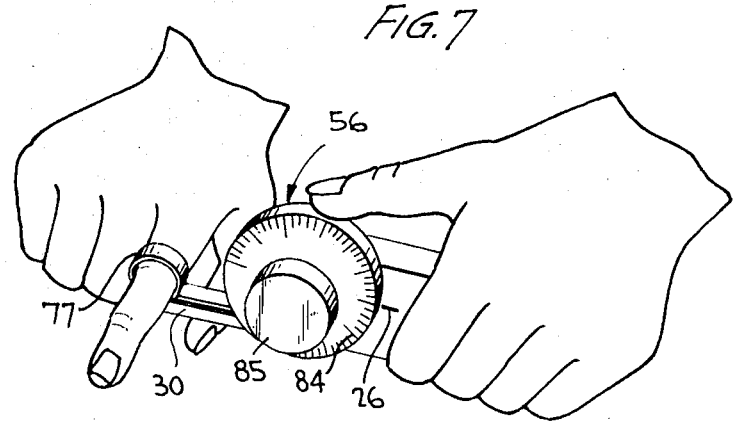
FIG. 7 is a perspective view of the device of the present invention utilized during measurement.

The operation of the circumference measuring devices of FIGS. 1 through 5 and FIG. 6 is best understood with reference to FIG. 7 wherein it can be seen that the handle grip 12 of the body 10 may be easily grasped with the fingers and palm of a hand, while the thumb of that hand is utilized to rotate dial 56.

In order to utilize the circumference measuring device of FIGS. 1 through 5, the dial 56 is rotated clockwise to wind spring 60 and once a measuring loop of sufficient size is obtained, the measuring loop is slipped onto an object to be measured such as the knuckle of a finger. When the force utilized to wind spring 60 is released, the measuring loop will tighten about the knuckle due to the unwinding force from the spring and the circumference of the knuckle may be read by the cooperation of indexing mark 26 with scale 84 on the dial. It will be appreciated that by winding spring 60 four to five times around shaft 48, the tension supplied by the spring to the measuring loop is relatively uniform over the range of measurements and thus each measurement, regardless of size, will be accurate due to the uniform tension applied to the flexible band.

The operation of the circumference measuring device of FIG. 6 is similar to that of the device of FIGS. 1 through 5; however, since there is no spring utilized to provide tension on the flexible band 68, dial 56 must be manually rotated counter clockwise once an object is inserted in the measuring loop in order to tighten the measuring loop around the object to permit measurement thereof.

Measurements obtained with the circumference measuring device of the present invention are extremely accurate in that due to the action of slot 78, the measuring loop is maintained in alignment to reduce inaccuracies caused by skewing thereof, and, as above described, accuracy is enhanced by the utilization of spring 60 to provide uniform tension over the range of measurements. From FIG. 7, it will be appreciated that the circumference measuring devices of the present invention may be easily operated with only one hand to facilitate use thereof.

It will be appreciated that the circumference measuring device of the present invention may be provided with flexible bands having any desired length, it merely being required that drum 50 have a suitable circumference to wind the flexible band without interference with the accuracy of the measurements. That is, the outer diameter of drum 50 must be such as to take up the length of the flexible band within the range of scale on the dial.

Inasmuch as the present invention is subject to many variations, modifications and changes in detail, it is intended that all matter described above or shown in the accompanying drawings be interpreted as illustrative and not in a limiting sense.

What is claimed is:

1. A circumference measuring device comprising an elongated body forming a housing, a handle grip extending from one side of said housing, and an arm extending from an opposite side of said housing;

a drum rotatably disposed in said housing;

a flexible band having a slot therein, an intermediate portion looped upon itself and passing through said slot to form a measuring loop, a movable end secured to said drum, and a stationary end secured to said arm;

spring means disposed in said housing and connected with said drum to bias said drum in a direction to decrease the circumference of said measuring loop; and a dial rotatably movable with said drum and extending from said housing adjacent said handle grip to be movable with the thumb of a hand grasping said handle grip against the bias of said spring means to increase the circumference of said measuring loop;

said dial having a scale around the periphery thereof and said body having an indexing mark thereon adjacent said dial whereby the circumference of an object is determined by the position of said scale on said dial relative to said indexing mark.

2. The invention as recited in claim 1 wherein said housing includes a central wall, a first bore on one side of said wall to receive said drum, a second bore on the other side of said wall to receive said spring means, an aperture extending through said wall and connecting said first and second bores, and a channel aligned with said arm and communicating with said first bore to receive said flexible band, and further comprising a shaft having a first end secured to said drum, a second end secured to said dial and a central portion extending through said aperture and connected with said spring means.

3. The invention as recited in claim 2 wherein said spring means is a flat spring wound around said shaft and having a first end connected with said central portion of said shaft and a second end held in a recess in said second bore.

4. The invention as recited in claim 1 wherein said dial and said drum are secured to a shaft, said shaft being movable in a first direction to increase the circumference of said measuring loop and in a second direction opposite to said first direction to decrease the circumference of said measuring loop, and said spring means is connected with said shaft to bias said shaft in said second direction whereby said measuring loop is tightened around an object to be measured by said spring means under uniform tension.

5. The invention as recited in claim 4 wherein said housing includes a first bore housing said drum, a second bore housing said spring means, and a small diameter aperture extending through a wall separating said first and second bores to receive said shaft, said second bore having a recess in the outer edge thereof, and said spring means is a flat spring wound around said shaft and having a first end connected with said shaft and a second end held in said recess.

6. The invention as recited in claim 5 wherein said dial has a chamber therein for receiving said wound spring and has a coating of polytetrafluoroethylene on the inner surface thereof engaging said body, and said drum has a coating of polytetrafluoroethylene on the inner surface thereof engaging said wall.

7. The invention as recited in claim 1 wherein said housing includes a stop projecting outwardly therefrom and said dial has a peripheral groove therein receiving said stop, said groove having first and second spaced ends whereby rotation of said dial is limited by abutment of said stop with said first and second ends of said groove.

* * * * *